United States Patent [19]

Kubota et al.

[11] 4,213,750
[45] Jul. 22, 1980

[54] ROTARY BLOW MOLDING MACHINE

[75] Inventors: Kikuo Kubota; Yoshiaki Yamagishi, both of Kawasaki; Masaru Yamaguchi, Yokohama, all of Japan

[73] Assignee: Toyo Seikan Kaisha Limited, Tokyo, Japan

[21] Appl. No.: 964,418

[22] Filed: Nov. 28, 1978

[51] Int. Cl.³ .............................................. B29C 17/07
[52] U.S. Cl. .................................. 425/531; 264/536; 264/543; 425/532; 425/537; 425/539; 425/540; 425/806
[58] Field of Search ............... 425/532, 537, 539, 540, 425/806 A, 806 R, 527, 531; 264/536, 543

[56] References Cited
U.S. PATENT DOCUMENTS

| 3,310,834 | 3/1967 | Simpson et al. | 264/543 X |
| 3,752,628 | 8/1973 | Hafele et al. | 264/536 X |
| 3,981,667 | 9/1976 | Bilodeau | 425/539 |
| 4,005,966 | 2/1977 | Nutting | 425/539 X |

Primary Examiner—Jan H. Silbaugh
Attorney, Agent, or Firm—Jordan and Hamburg

[57] ABSTRACT

A rotary blow molding machine includes a rotor mounted on a horizontal driving shaft, a recovery hopper, an ejector mechanism, and mold stations mounted on the outer periphery of the rotor, which mold stations are radially disposed and circumferentially equally spaced, the mold stations each carrying thereon a split mold unit capable of opening and closing in the direction of the width of the outer peripheral surface of the rotor by a mold opening/closing mechanism, a mold clamping mechanism and a flash blow-pipe, the said split mold unit having a mold-release mechanism. It is so constructed as to produce blow moldings successively continuously at high speed and completely automatically during a single rotation of the mold stations on and along the same circular rotation track.

16 Claims, 14 Drawing Figures

ROTARY BLOW MOLDING MACHINE

This invention relates to a blow molding machine whereby molten, a softened hollow tube (hereinafter referred to as "parison") of a thermoplastic synthetic resin extruded from the die head of an extruder is clamped within a split mold unit arriving in synchronism with the extrusion rate, and are blow-molded continuously into a desired shape, e.g. bottles.

The rotary blow molding machines of this sort disclosed in U.S. Pat. No. 2,579,399, Japanese patent publications Nos. 3583/64 and 42932/72, and Japanese patent public disclosure No. 96659/73, have many advantages, for example, the diameter of the rotor mounted on a horizontal driving shaft is constant, so that the mold size is constant and the machines are suitable for a mass production of the same kind of article, besides the construction is so simple that it is possible to make the machine size smaller and the initial cost less expensive, and furthermore even a die head of a complicated structure attached to the extruder can be used. However, such rotary blow molding machines are disadvantageous in that the release of a molded article from a split mold unit is difficult and the mold-release mechanism is very complex in structure, besides the removal and discharge of a molded article and the separation and recovery of a scrap parison connected to the molded article are very difficult.

Moreover, in case the molded article is a thin bottle, a large number of bottles are, as a final step, encased and warehoused as stock or sent to a packer, etc. But in storage or in transport they are often crushed easily by an excess loading, with the resulting decrease in volume and deformation causing overflow of the contents when the bottles are filled with a predetermined quantity of contents. To eliminate such drawbacks, the prior art blow molding involves heat-sealing, just after the discharge of a molded bottle, the hole of a blow needle which has been pierced through the blow hole of a mold at the time of molding, whereby a cushion air is left within the sealed bottle and thereby a sufficient resistance is produced against the foregoing crushing force in storage or in transport. In such a heat-sealing operation, however, the pierced hole in the bottle must be directed in a certain posture toward a heat sealer, but the bottles discharged from a blow molding machine are in a disorderly posture without control, so that the bottles must be corrected in posture manually one by one so as to direct toward a certain direction, which is very troublesome.

The primary object of this invention is to provide a rotary blow molding machine whereby there is attained a continuous, automatic systematization of all of the operation of introducing a parison stably into a split mold unit, the operation of securely opening and closing each split mold unit, the operation of securely clamping each split mold unit, the operation of blowing air into the parison clamped between the mold halves of a split mold unit to thereby inflate the parison, the operation of smoothly recovering a scrap parison, the operation of knocking out, or releasing, the molded article exactly from each split mold unit, and the operation of securely receiving and discharging the knocked-out molded article.

Another object of this invention is to provide a rotary blow molding machine for effecting quickly and smoothly the mold-release and discharge of a molded article as well as the separation and recovery of a scrap parison connected to the parison in the molding portion.

A further object of this invention is to provide a rotary blow molding machine having a simplified and compact mold-release mechanism attached to a split mold unit.

Another object of this invention is to provide a rotary blow molding machine equipped with an ejector mechanism which is operable regardless of the orientation of a discharged molded article in the discharge operation thereof, and also equipped with an ejector mechanism which imparts a directivity or orientation to the discharged posture of a molded article.

A further object of this invention is to provide a rotary blow molding machine of totally high performance.

Still further objects of this invention will become apparent from the gist of the description of the specification and drawings of the invention.

The apparatus of this invention includes a rotor mounted on a horizontal driving shaft, and radially disposed and circumferentially equally spaced mold stations mounted on the outer periphery of the rotor, the mold stations each carrying thereon a split mold unit capable of opening and closing in the direction of the width of the outer peripheral surface of the rotor, the split mold unit having a mold-release mechanism. It it totally automated and systematized, and is constructed so as to produce blow moldings successively continuously at high speed and completely automatically during a single rotation of the mold stations on and along the same circular rotation track, said completely automatic high-speed production involving in one cycle all of the operation of guiding and holding a parison by a tip end seat of a flash blow-pipe attached to each mold station, the parison being extruded and hanging down from the die head when the mold stations, which are moving continuously along the said same circular rotation track with the rotation of the rotor, have arrived at a predetermined phase position; the operation of inserting the parison into each split mold unit; the operation of clamping each mold unit; the operation of blowing air into the inserted parison to inflate the latter; the operation of cooling the split mold unit in closed state to harden the molded article; the operation of opening the split mold unit when arrived at a predetermined phase position on the said rotation track; the operation of recovering a scrap parison which has been separated from the parison in the molding portion at the time of the said mold clamping operation and held on the tip end seat of the flash blow-pipe, by blowing off the scrap parison into a recovery hopper which is located at a predetermined position outside the said rotation track; and the operation of temporarily receiving and holding the released, molded article for its discharge onto a belt conveyor.

A first embodiment of this invention is given below to further illustrate the invention.

In a rotary blow molding machine A of this invention, as shown in FIGS. 1 through 5, a horizontal driving shaft 32 is rotatably fixed at both ends thereof through pillow blocks 28, 30 which are fixed with a fixing bolt 26 to concave portions 22a, 24a respectively, the concave portions 22a, 24a being formed centrally on the tops of parallel and opposed side plates 22, 24 of a box-like frame 20, respectively. Mounted on the horizontal driving shaft 32 is a rotor 34 on the outer periphery of which are mounted a plurality of mold stations 46. The mold stations 46 carry thereon split mold units 36 which are radially disposed and circumferentially equally spaced, and they include a symmetrical mold opening/closing mechanism 38 for opening and closing each split mold unit 36 horizontally in the direction of the width of the outer peripheral surface of the rotor 34. The mold stations 46 are each further provided with a mold clamping mechanism 40 for firmly clamping a closed split mold unit 36, a mold-release mechanism 42 for a molded article, and a flash blow-pipe 44. The reference numeral 48 is an ejector mechanism provided at the lower end thereof with an intake port 48a, which extends tangentially upwards in a wedged form between the mold halves of an open split mold unit 36 in a phase position Y1 with an angle of rotation of nearly 315° to the right of the top origin of phase position Y0 on a circular rotation track Y which passes through the center of each split molt unit 36 when the top origin of phase position Y0 is assumed equal to 0° and rotated in the direction of the arrow shown in FIG. 2. The ejector mechanism 48 is also provided at the upper end thereof with a discharge port 48b, under which is positioned the starting end of a belt conveyor 50. The reference numeral 52 is a recovery hopper having a receiving port 52a for recovering a scrap parison Pb, which port opens in the vicinity of and outside a phase position Y2 with an angle of rotation of nearly 285° on the circular rotation track Y. The numeral 54 is a die head projecting from an extruder (not shown) and having a downward die opening 54a which opens tangentially upwards with respect to a phase position Y3 with an angle of rotation of nearly 75° on the circular rotation track Y. A motor 56 is fixed on a rack 24b which overhangs outside the side plate 24, the driving torque of the motor 56 being transmitted by a belt 60 which is entrained about a pulley 56b mounted on a motor shaft 56a and also about a pulley 58b mounted on an input shaft 58a of a reduction gear 58, then transmitted to the horizontal driving shaft 32 via an outer gearing between a pinion 62 mounted on an output shaft 58c of the reduction gear 58 and a gear wheel 64 mounted on one end of the horizontal driving shaft 32, and the rotor is driven integrally with the horizontal driving shaft 32.

In the drawings, the reference numerals 66 and 68 are arches which span the concave portions 22a, 24a of the side plates 22, 24.

Figure 4:
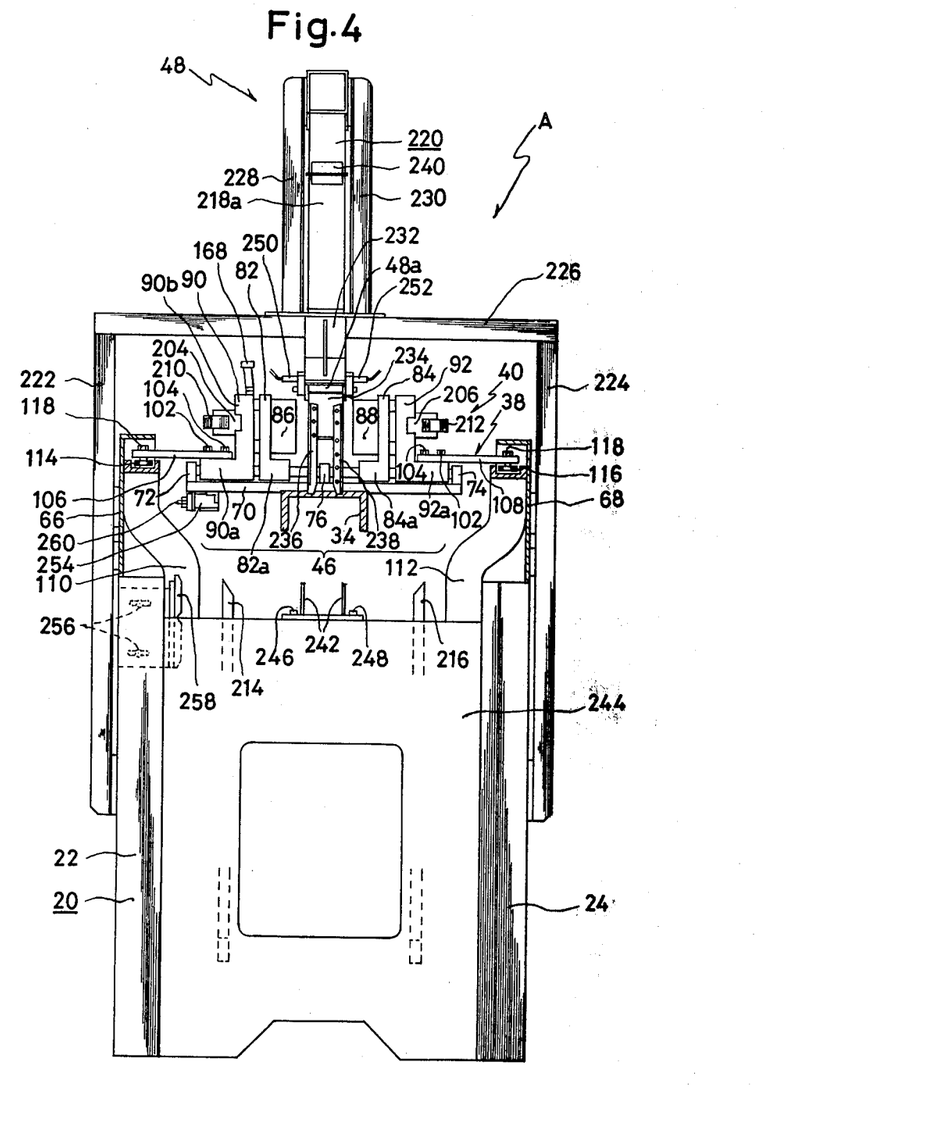
Figure 5:
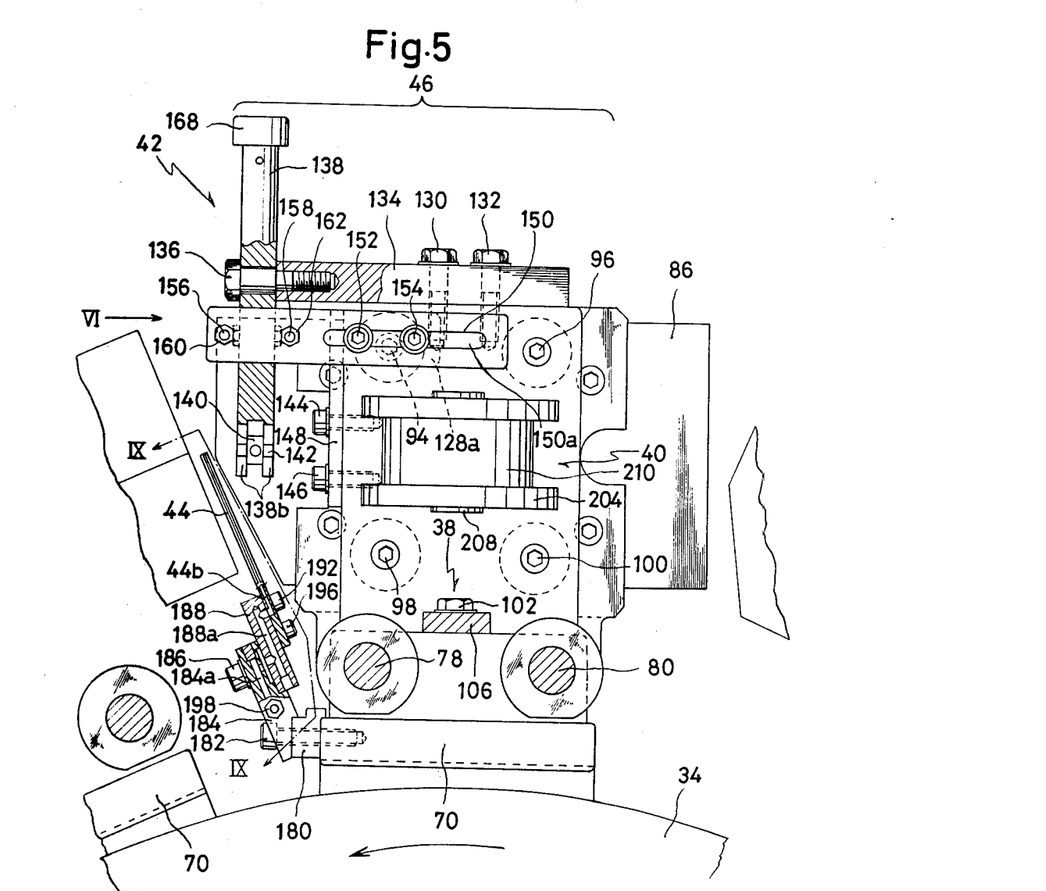
FIG. 5 is a partially cutaway right side view of a mold station mounted on a rotor of the molding machine of this invention.

As shown in FIGS. 4 and 5, the mold opening/closing mechanism 38 included in each mold station 46 is carried on a supporting base 70 which is secured to the outer periphery of the rotor 34. Projecting upwards from both ends and the center of the supporting base 70 are rod supports 72, 74 and 76, through which are horizontally secured parallel guide rods 78, 80. Mold holders 82, 84 have horizontal lower end portions 82a, 84a which are slidably fitted over the guide rods 78, 80. On the opposed vertical surfaces of the mold holders 82, 84 are detachably mounted mold halves 86, 88. On the other hand, L-shaped sliders 90, 92 are mounted integrally back to back with and at a certain spacing from the mold holders 82, 84 by means of a pair of upper and a pair of lower connecting bolts 94, 96 and 98, 100. The L-shaped sliders 90, 92 have horizontal lower end portions 90a, 92a on which are overhung rods 106, 108 with bolts 102, 104. To the free ends of the overhanging rods 106, 108 are fixed cam followers 114, 116 with stud by means of nuts 118, the cam followers engaging grooved cam rails 110, 112 which extend circularly along the inner wall surfaces of the side plates 22, 24 and arches 66, 68 so as to expand in spacing in an open area S of the rotation track Y which passes through the center of each split mold unit 36 shown in FIG. 2 and so as to contract in spacing in a closed area S with respect to right and left sides with the entire rotation track Y put centrally therebetween.

Figure 7:
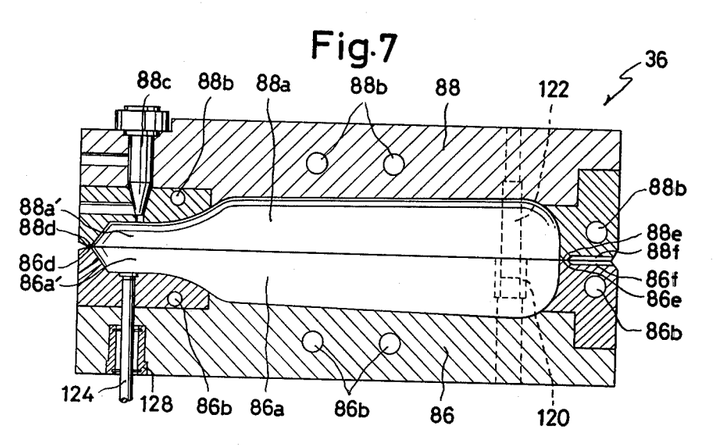
FIG. 7 is a central cross section of a closed split mold unit.

As shown in FIG. 7, each split mold unit 36 in the case of forming a plastic bottle consists of a pair of mold halves 86, 88 having concaved inner surfaces 86a, 88a each of which assumes the shape of a half of the external shape of the plastic bottle. The mold halves 86, 88 are further provided with cooling water holes 86b, 88b and also with mold mating pins 120, 122. In addition, the concaved inner surface 88a has a neck portion 88a' through which is formed a blow hole 88c, in which is projectably contained a blow needle (not shown). On the other hand, the concaved inner surface 86a of the other mold half 86 also has a neck portion 86a' through which is inserted a knock-out pin 124 so that the inner end of the knock-out pin 124 extends projectably through a bushing 128 buried with screws 126, the knock-pin 124 functioning to release the plastic bottle after blow molding from the concaved inner surface 86a.

Figure 6:
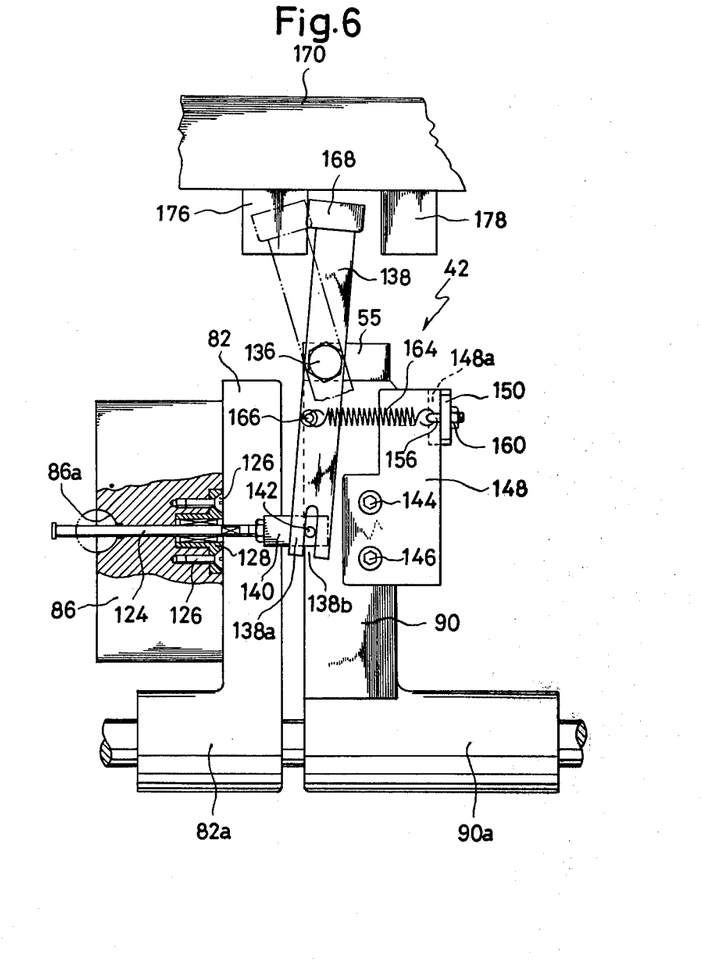
FIG. 6 illustrates a mold-release mechanism included in the mold station taken on the arrow VI of FIG. 5.

Referring to the mold-release mechanism 42 which controls the operation of the knock-out pin 124, as shown in FIGS. 5 and 6, a supporting rod 134 is fixed at one end thereof to the upper end of the L-shaped slider 90 by means of fixing bolts 130, 132, and to the overhanging free end of the supporting rod 134 is pivoted for leverage movement an operating lever 138 by means of a bolt pin 136. The operating lever 138 has bifurcated lower ends 138a which are notched to form grooves 138b. In the grooves 138b is fitted a connecting pin 142 which projects from both sides of the outer periphery of an end head 140 threaded to the outer end of the knock-out pin 124. To the end face of the L-shaped slider 90 is fixed a mounting bracket 148 with fixing bolts 144, 146.

The mounting bracket 148 has a bent portion 148a, adjacent to which is provided a spring anchor plate 150. In the spring anchor plate 150 is formed a slot 150a through which are fastened fixing bolts 152, 154 to fix one end of the spring anchor plate 150, to the overhanging side of which are fixed a pair of eyebolts 156, 158 with nuts 160, 162. At the eyebolts 156, 158 are anchored one ends of a pair of coiled tension springs 164, the other ends of which are hooked to a pair of retaining pins 166, to thereby keep the operating lever 138 always in the tendency to pivotally move counterclockwise centered around the bolt pin 136 as is shown with an imaginary line in FIG. 6, so that the inner end of the knock-out pin 124 is kept retracted within the concaved inner surface 86a. On the other hand, to the upper end of the operating lever 138 is fixed for idle motion a cam follower 168. When the cam follower 168 engages between cam guides 176, 178 which are secured to the bottom of an overhung crossgirder 170 by means of mounting bolts 172, 174 as shown in FIG. 8, the operating lever 138 is moved pivotally clockwise centering around the bolt pin 136 against the resilient force of the coiled tension springs 164 (see FIG. 6), so that the inner end of the knock-out pin 124, which is so constructed as to move integrally with the operating lever 138, projects from the concaved inner surface 86a whereby the molded article is sure to be released.

Figure 9:
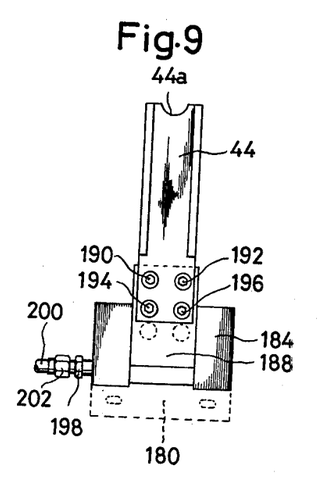
FIG. 9 illustrates a flash blow-pipe taken on the line IX—IX of FIG. 5.
Figure 10:
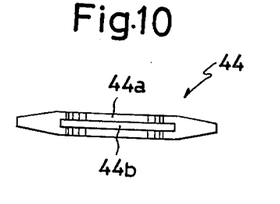
FIG. 10 is an enlarged end view of the flash blow-pipe.

As shown in FIG. 5 as well as in FIGS. 9 and 10, the flash blow-pipe 44 is a flat square pipe with four chamfered corners. To the central portion of the front end of the supporting base 70 is secured the lower end of a mounting base 184 slantwise with an anchor bolt 182 through a spacer block 180, and to the mounting base 184 is spliced a pipe holder 188 with a splicing bolt 186. To the pipe holder 188 is slantwise fixed both sides of the lower end portion of the flash blow-pipe 44 by means of a pair of upper and a pair of lower fixing bolts 190, 192 and 194, 196. The flash blow-pipe is provided at the tip end thereof with a bay-like seat 44a for guiding and holding a parison P extruded from the die head 54, and it is positioned so that the seat 44a faces on the circular rotation track Y which passes through the center of each mold station. On the other hand, air inlet ports 184a, 188a are formed in the mounting base 184 and the pipe holder 188 respectively so that they communicate with each other and also the air inlet port 188a communicates with the bore 44b of the flash blow-pipe 44. To the exterior end of the air inlet port 184a is attached a mouth piece 198, which is connected with a connector 202 of an air hose 200, the air hose 200 connected to the source of a compressed air (not shown), whereby the bore 44b of the flash blow-pipe 44 is communicated with the compressed air source (not shown).

Figure 1:
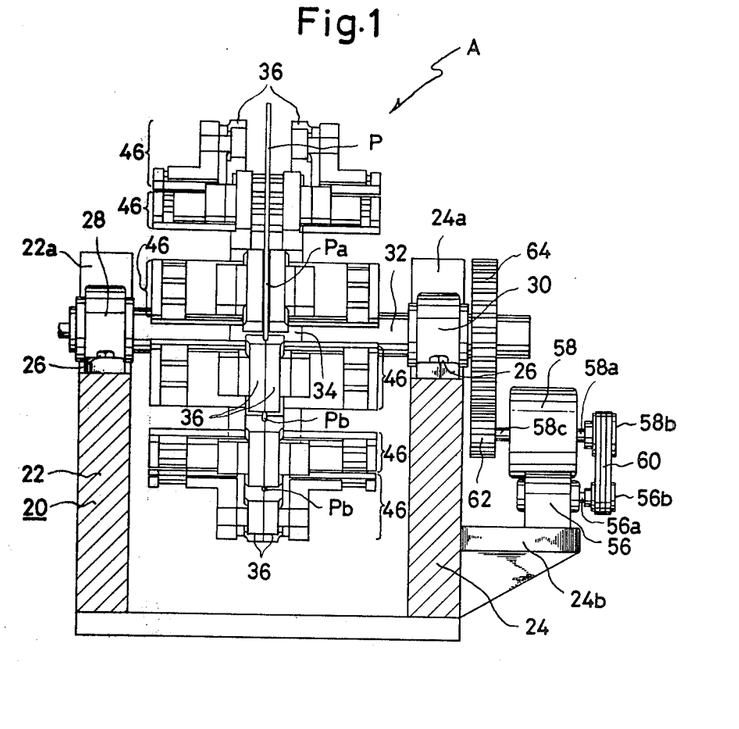
FIG. 1 is a partially cutaway, schematic front view of the molding machine of this invention.
Figure 2:
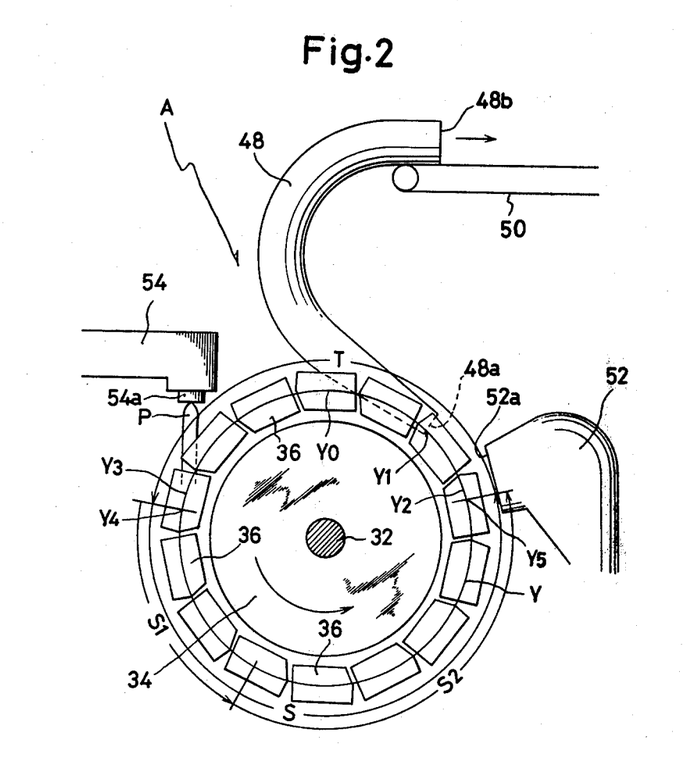
FIG. 2 is a system configuration diagram showing the operation procedure of a first embodiment of the molding machine of this invention.
Figure 3:
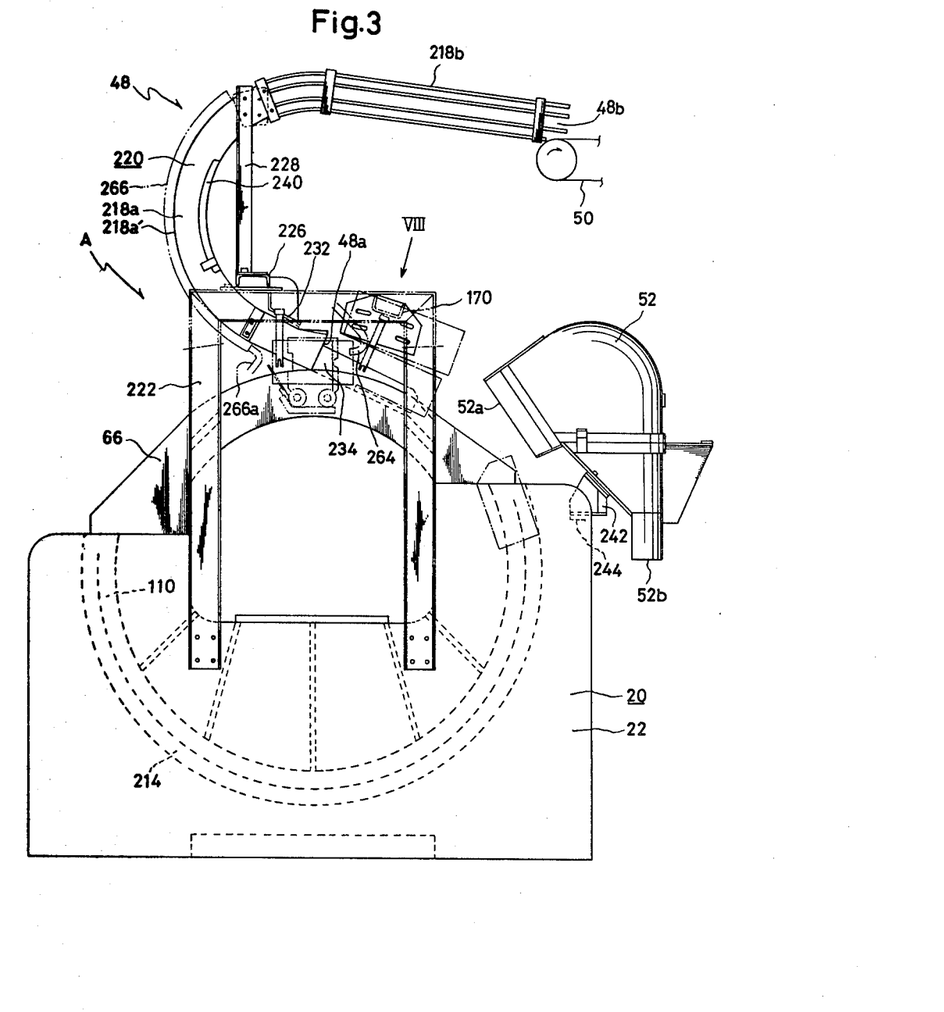
FIGS. 3 and 4 are a partially omitted, schematic right side view and a partially cutaway rear view respectively showing a first embodiment of the molding machine of this invention.

Referring to the molding clamping mechanism 40, as shown in FIGS. 3 through 5, bifurcated brackets 204, 206 are attached horizontally at a right angle to the central portions of the vertical outside surfaces of the L-shaped sliders 90, 92 respectively. Between the bifurcated brackets 204, 206 are pivoted cam followers 210, 212 for idle motion respectively with a pin 208. Along and in parallel with both sides of the rotation track Y which passes through the center of each split mold unit 36, and with only the closure area T of the said rotation track Y put therebetween, there are laid cam rails 214, 216 engageable with the cam followers 210, 212 and in the form of an arc. The split mold unit 36 which has been closed by the mold opening/closing mechanism 38 is subjected to the action of a clamping force generated by the engagement between the cam followers 210, 212 and the cam rails 214, 216 and is thereby sealed completely, and at the same time there is produced a force for cutting off the scrap parison Pb present between the parison Pa in the molding portion of the split mold unit 36 and the mold station 46.

Figure 8:
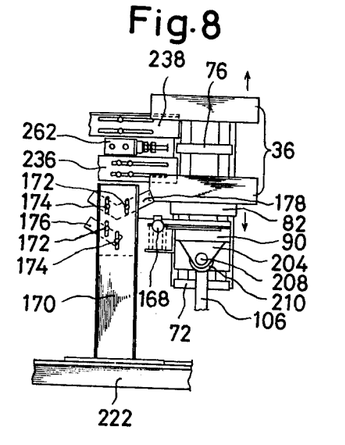
FIG. 8 is a partially cutaway view taken on the arrow VIII of FIG. 3.

Referring to the ejector mechanism 48, as shown in FIGS. 3, 4 and 8, it is composed of a series of an arc-shaped discharge chute 220 the front half of which is an arc-shaped duct portion 218a and the latter half is a paling tunnel portion 218b, with the duct and tunnel portions 218a, 218b connected together in series. Adjacent both outsides of the left and right side plates 22, 24 of the machine frame 20 are mounted upright⊓-shaped supporting frames 222, 224, between the upper ends of which spans a horizontal beam 226. On the upper surface of the central portion of the horizontal beam 226 are mounted holding arms 228, 230 upright in parallel with each other, between the upper ends of which is inserted the upper portion of the duct 218a. Hanging from the side of the central portion of the beam 226 is a bracket 232 which holds the upper side of the intake port 48a. From the intake port 48a projects a guide gutter 234, and from both sides of the inside bottom of the guide gutter 234 extend forwardly a pair of receiving guides 236, 238 in parallel and in the form of an inverter / \ in section. The guides 236, 238 extend in a wedged form to the lower side between open mold halves 86, 88 of an incoming mold station 46.

The reference numeral 240 is a window provided intermediate the duct portion 218a, which window is used to take out a molded article in the event of clogging. The numeral 242 is a bracket for supporting the recovery hopper 52, which bracket is fixed to an end plate 244 of the machine frame 20 by means of bolts 246, 248. The numerals 250 and 252 are light projector and receiver to detect a clogging of the intake port 48a of the discharge chute 220. The numeral 254 is a microswitch attached to the bottom of the end of the supporting base 70. When the mold station 46 has arrived at the phase portion Y2 on the rotation track Y, a cam follower 260 provided at the tip engages a cam plate 258 which is fixed to the upper inside portion of the side plate 22 with check bolts 256, and every time such engagement is made the microswitch 254 issues a detection signal to control the timing for supplying a compressed air from the compressed air source into the bore 44b of the flash blow-pipe 44 and blowing off the scrap parison Pb held on the seat 44a into the recovery hopper 52. The numeral 262 is also a microswitch which detects the passing of a molded article every time the latter passes on the receiving guides 236, 238 to control the timing for ejecting a compressed air from an air pipe 264 which faces the opening end of the intake port 48 of the discharge chute 220 thereby forcing the molded article through the discharge chute 48 onto the starting end of the stand-by belt conveyor 50. In the above construction of a first embodiment of this invention, the grooved cam rails 110, 112 which engage the cam followers 114, 116 of the mold opening/closing mechanism 38 which controls the opening and closing of each split mold unit 36, are laid symmetrically and circularly along the inner wall surfaces of the left and right side plates 22, 24 and also along the inner wall surfaces of the arches 66, 68 so that in FIG. 2 a closure area S in which the split mold units 36 are closed is formed between phase portions Y4 and Y5 with angles of rotation nearly ranging from 80° to 280°, and an open area T in which the split mold units 36 are kept open is formed between phase positions Y5 and Y4 with angles of rotation ranging from 280° to 80°. Therefore, if the extruder (not shown) and the motor 56 are driven and the rotor rotated integrally with the horizontal driving shaft 32 in synchronism with the extrusion rate of parison P which is extruded and hangs down from the downward die opening 54a of the die head 54, then when the mold station 46 carrying thereon an open split mold unit 36 has arrived at a position just before the phase position Y3, the hanging parison P is temporarily guided and held onto the seat 44a formed at the tip end of the flash blow-pipe 44, and at the same time the split mold unit is closed at the phase position Y4. Thereafter, in the closure area S, by the engaging relation between cam followers 210, 212 of the mold clamping mechanism 40 and cam rails 214, 216 the parison P now contained between the mold halves 86 and 88 is cut off at the front end with blade portions 86d, 88d and also at the rear end with blade portions 86e, 88e to separate the parison Pb of the scrap portion Pa present in the molding portion between the concaved inner surfaces 86a, 88a, and at the same time the scrap parison Pb is held by holder portions 86f, 88f which are formed at the rear ends of the mold halves 86, 88. While the split mold unit 36 passes an area S1 which is about one-third of the entire closure area S, a blow needle (not shown) is inserted from the blow hole 88a into the parison Pa in the molding portion to inflate the parison Pa towards the concaved inner surfaces 86a, 88a. Subsequently, while passing an area S2 which is about two-thirds of the entire closure area S, cold water is recycled into the cooling water holes 86b, 88b formed in the mold halves 86, 88 to cool and harden the molded article.

Just after the mold station carrying thereon a closed split mold unit 36 has moved from the closure area S to the open area T, the scrap parison Pb which has been released from the holder portions 86f, 88f of the mold halves 86, 88 and is now held by the seat 44a at the tip end of the flash blow-pipe 44 is blown off into the recovery hopper 52 through the receiving port 52a by a compressed air ejected forcibly from the opening end of the bore 44b upon detection of such movement by the microswitch 254, and the scrap parison Pb thus recovered is discharged from a lower collection port 52b of the recovery hopper 52.

Then, the cam follower 168 of the mold-release mechanism 42 for the release of a molded article engages the cam guides 176, 178 and causes the operating lever 138 to move pivotally, so that the interlocking knock-out pin 124 projects from the concaved inner surface 86a of the mold half 86 to knock out the molded article conforming to the said inner surface 86a. The molded article thus knocked out is dropped and held onto the receiving guides 236, 238 and is then pushed from behind by the flash blow-pipe 44 mounted slantwise at the front end of the succeeding mold station 46, so that it is gradually moved toward the intake port 48a of the discharge chute 48 on and along the receiving guides 236, 238. Upon detection of the passing of the molded article by the microswitch 262, a blast of compressed air is directed from the air pipe 264 forcibly toward the molded article now arriving at the guide gutter 234, resulting in that the molded article which has been imparted a propulsive force by the compressed air is urged up through the discharge chute 48 toward the discharge port 48b, and drops onto the stand-by belt conveyor 50 and is sent to the next process.

In this way, each mold station 46 completes a one cycle rotation, and the same operation is repeated.

Thus, the apparatus of this invention produces blow moldings successively continuously at high speed and completely automatically during a single rotation of the mold stations on and along the same circular rotation track Y, said completely automatic high-speed operation involving all of the operation of guiding and holding the parison P onto the tip end seat 44a of the flash blow-pipe 44 when the parison P extruded and hanging from the die head 54 has arrived at a predetermined phase position on the circular rotation track Y while a large number of the mold stations 46 are continuously moved on and along the same circular rotation track Y; the operation of enclosing the parison P within open split mold unit 36; the operation of clamping the mold; the operating of shaping the parison by blowing air into the parison P enclosed within the split mold unit 36; the operation of cooling the split mold unit 36 now in a closed state to harden the molded article; the operation of opening the split mold unit 36 when it arrives at a predetermined phase position on the circular rotation track Y; the operation of recovering the scrap parison Pb which has been separated from the parison Pa within the mold and is now held on the tip end seat 44a of the flash blow-pipe 44 by blowing off the scrap parison Pb into the recovery hopper 52; the operation of releasing the molded article from the split mold unit 36; the operation of conveying the released molded article to the intake port 48a of the discharge chute 220; and the operation of blowing off the conveyed, molded article into the discharge chute 220 and transferring it onto the belt conveyor 50 for its conveyance to the next process.

The apparatus of this invention has a very intensive and compact structure including many mold stations 46. Specially, adoption of the flash blow-pipe 44 assures exact alignment guiding and positioning of the extruded parison P which hangs from the die head 54 with respect to the split mold units 36, so that molded articles of high quality having a uniform dimensional accuracy can be obtained. Besides, the mold-release of molded articles is positive, and the separation, discharge and recovery of scrap parisons from molded articles can be done smoothly.

In the above first embodiment of this invention, an arc-shaped pressure air jacket 226 may be provided along an arc-shaped outside surface 218a' of the front half or duct portion 218a of the discharge chute 220 in such a manner as is shown with an imaginary line in FIG. 3, and at the same time many jet holes (not shown) may be formed in the arc-shaped outside surface 218a'. In such a construction, if a compressed air is fed from an air pipe 266a, it enters the pressure air jacket 266 and jets from the jet holes to the inside of the duct portion 218a, so that the molded article blown off into the intake port 48a passes smoothly because its frictional force with respect to the inside of the arc-shaped outside surface 218a' is decreased. Consequently, the pressure of the air jetting from the air pipe 264 which faces the intake port 48a can also be decreased; that is, the air pressure source communication with the air pipe 264 may be of small scale and small capacity. If Teflon coating is applied to the inside of the arc-shaped outside surface 218a', it is possible to further decrease the frictional force.

Now, a second embodiment of this invention is given below to further illustrate the invention.

As shown in FIGS. 11 through 14, a rotary blow molding machine B of this invention is of the same mechanism and structure and has the same members as the rotary blow molding machine A of the first embodiment except the ejector mechanism 48. Therefore, with respect to the same portions having the same function and effect, there will be put the same reference numerals also in the following second embodiment to avoid overlapping with the first embodiment.

Ejector mechanism 268 mounted in the rotary blow molding B is constructed as follows. Large and small suction holes 270, 272 are formed in one side plate 274, the suction holes 270, 272 being equally spaced in the direction of the outer periphery of the one side plate 274 and formed by the same number as the number of the mold stations 46 which are mounted on the outer periphery of the rotor 32, and functioning to temporarily catch and hold by vacuum suction a molded bottle 'a' which has been knocked out by the mold-release mechanism 42 from the mold half 86 of the split mold unit 36 arrived at the phase position YO of the top origin. The reference numeral 280 is an eject feed turret which is circulatable up and down from a horizontal belt conveyor 276 to between the mold halves 86, 88 of the mold station 46 which arrives in open state at the top origin phase position YO so that the suction holes 270, 272 arriving at the top phase position face the side of the starting end of the horizontal belt conveyor 276 and the suction holes 270, 272 arriving at the bottom phase position face one mold half 86. The ejector feed turret 280 is mounted on a horizontal turret shaft 278 which is rotatable in synchronism with the horizontal driving shaft 32 of the rotor 34.

The ejector feed turret 280 has the suction holes 270, 272 formed in the one side plate 274 of catch/holder portions 282 which project peripherally radially by the same number as the number of the mold stations 46. The interior of the eject feed turret 280, through the central portion of which extend the horizontal turret shaft 278 and also a boss 286 fixed with a wedge 284, is partitioned equiangularly in correspondence to the suction holes 270, 272 to form division chambers 288. The central portion of the other side plate 290 surrounding in the vicinity of the boss 286 is bored circumferentially at equal spacings to form valve ports 292. On the other hand, a valve mechanism 294, through which rotatably extends the horizontal turret shaft 278, is provided in close contact with an in an enveloping relation to the valve ports 292 so that is can close the valve port 292 arriving at a predetermined phase position.

⊓-Shaped supporting frames 296, 298 are attached to the outside central portions of the arches 66, 68 so as to stand upright in parallel therewith. To the outside and inside surfaces of the upper central portions of the supporting frames 296, 298 are fixed bearing support plates 306, 308 respectively through adapter plates 300, 302 by means of bolts 304. And to the upper outside surface of the bearing support plate 306 and to the upper inside surface of the bearing support plate 308 are fixed bearings 312, 314 respectively with bolts 310. The horizontal turret shaft 278 is rotatably journaled at both end thereof in the bearings 312, 314 and also journaled intermediate in a bearing 322 which is fixed with bolts 320 to an end plate 318 of a rack 316, the rack 316 being mounted horizontally at one end thereof so as to enclose the bearing 314 with respect to the inside surface of the bearing support plate 308. On the other hand, a supporting arm 324 is attached at one end thereof the supporting frame 298, and to the supporting arm 324 is fixed a bracket 328 with bolts 326 so as to intersect at right angles with each other. The bracket 328 has a bent outer end to which is attached for idle motion a guide sprocket 332 with a bolt pin 330. From the outside surface of the supporting frame 298 projects a short shaft 336 through an adapter plate 334. On the short shaft 336 is mounted for idle motion a boss portion 338a of a rotary lever 338. Through the upper end of the rotary lever 338 is fastened a threaded pin 344 with clamping nuts 340, 342, and on one end of the pin 344 is mounted for idle motion a tension sprocket 346. On the other hand, at the lower end of the rotary lever 338 is anchored one end of a coiled tension spring 348, the other end of which is anchored at the adapter plate 334, whereby the rotary lever 338 is maintained always in the tendency to a unidirectional rotation. A driven sprocket 356 is fixed with bolts 354 to a boss 352 with a wedge 350 at a through end of the horizontal turret shaft 278, while a driving sprocket 358 is fixed to an output shaft 58c between the reduction gear 58 and the pinion 62, and both the sprockets 356 and 358 are connected together by an endless transmission chain 360 which is in intermediate engagement with a guide sprocket 332 and a tension sprocket 346 whereby the driving torque of the motor 56 is transmitted to the horizontal turret shaft 278 through the reduction gear 58 and thus a synchronous operation at the same peripheral speed with the horizontal driving shaft 32 is made possible.

Figure 13:
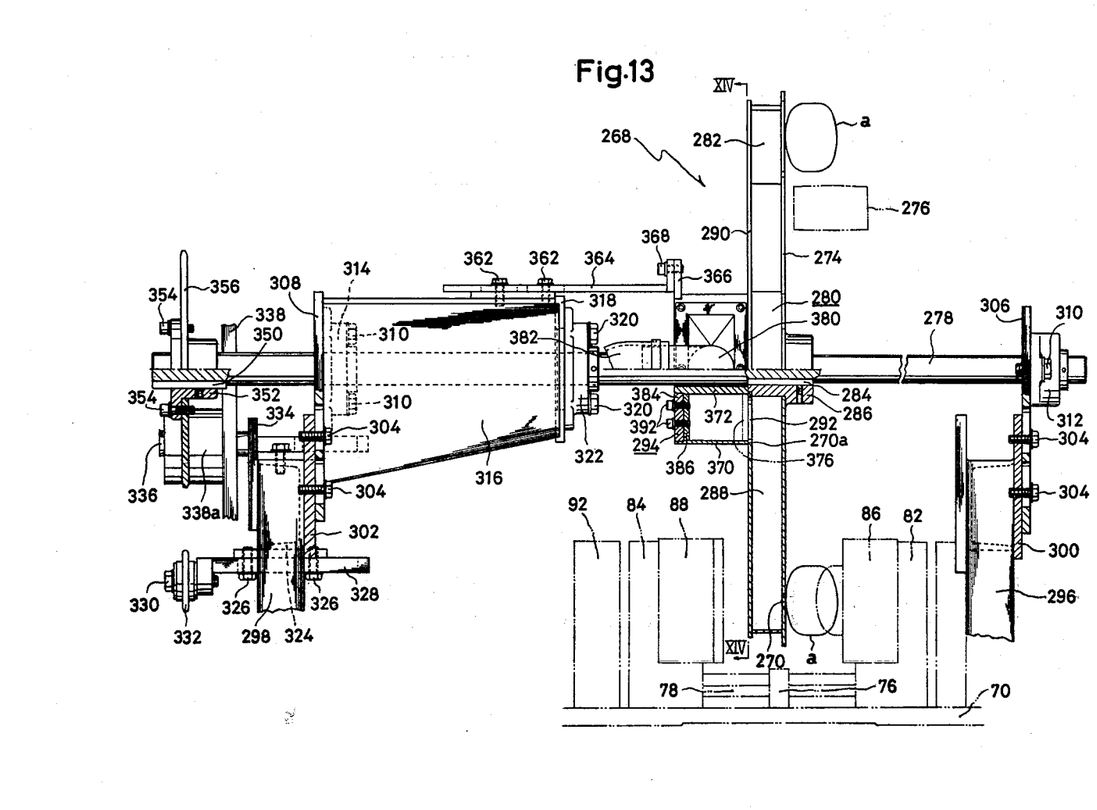
FIG. 13 is a sectional view taken on the line XIII—XIII of FIG. 11.
Figure 14:
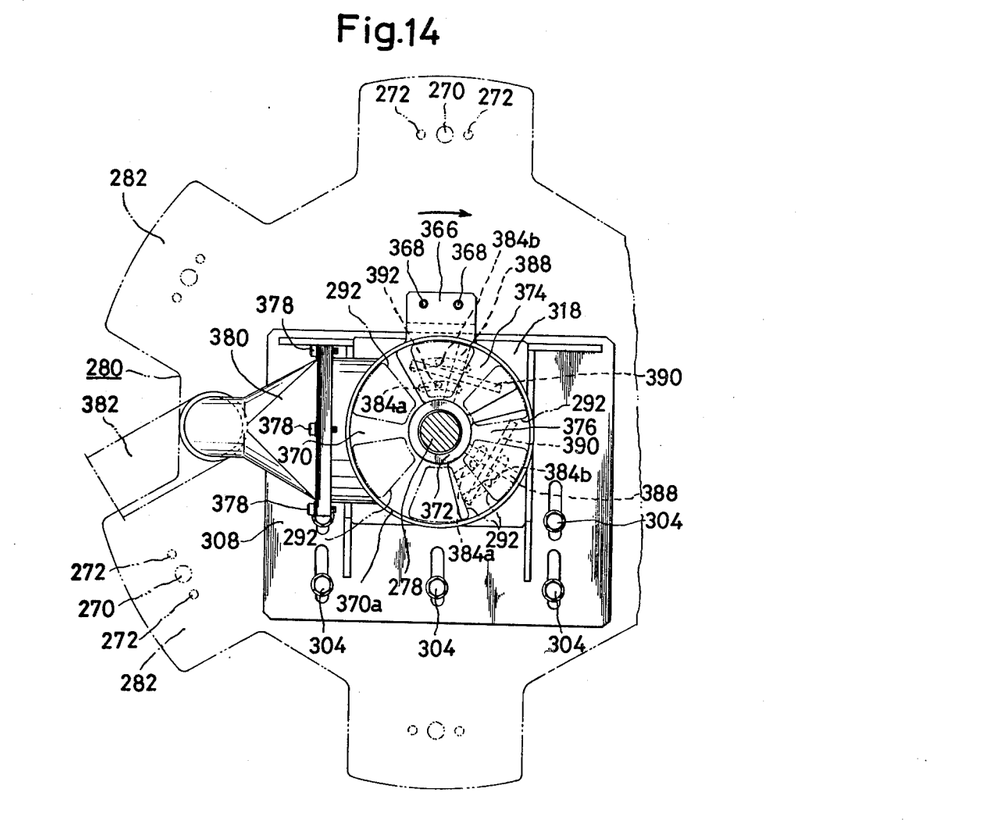
FIG. 14 is a sectional view taken on the line XIV—XIV of FIG. 13.

As illustrated in FIG. 13 and 14, an overhung bracket 364 is fixed at the base thereof to the central portion of the upper surface of the rack 316 by means of bolts 362. The overhung bracket 364 has a bent end, to which is fixed an upper end mounting piece 366 of a cylindrical vacuum valve box 370 with bolts 368 so that the vacuum valve box 370 hangs from the said bent end of the overhung bracket 364. Through the center of the vacuum valve box 370 is fitted a sleeve 372 through which rotatably extends the horizontal turret shaft 278. In the vacuum valve box 370 which surrounds the sleeve 372 are mounted a pair of fan-shaped slide valve plates 374, 376 so that their phase positions can be adjusted, the slide valve plates 374, 376 functioning to close the valve port 292 arriving at a predetermined phase position of the ejector feed turret 280. On the other hand, a mouth piece 380 is fixed to a side end of the vacuum valve box 370 with bolts 378, the mouth piece 380 communication with a vacuum source (not shown) through a vacuum pipe 382.

As illustrated in FIGS. 13 and 14, the slide valve plates 374, 376 are connected to a mounting plate 386 adjacent the inside surface of a closure end plate 384 of the vacuum valve box 370 with partition plates 388 and connecting plates 390 interposed therebetween, each said partition plate and connecting plate crossing on the back. In the closure end plate 384 are formed arc-shaped long holes 384a, 384b, through which are movably threaded adjusting bolts 392. Integrally with the slide valve plates 374, 376 the adjusting bolts 392 are moved along the arc-shaped long holes 384a, 384b. Once the slide valve plates 374, 376 are set to a phase position such that, for example as shown in FIG. 14, during a rotation section during which the suction holes 270, 272 of the eject feed turret 280 move from one mold half 86 which is about to complete the knockout of the molded article 'a' to the belt conveyor 276, the valve plates 374,376 do not slide and close the valve port 292 of the division chamber 288 corresponding to the said suction holes 270, 272, then the adjusting bolts 392 are tightened to fasten the slide valve plates 374, 376. The surface of the slide valve plates 374, 376 are exposed onto the same datum plane as an opening edge 370a of the vacuum valve box 370, so that when the opening edge 370a of the vacuum valve box 370 encloses the valve ports 292 of the eject feed turret 280 entirely, the surface of the slide valve plates 374, 376 slidably contacts the other side plate 290 of the eject feed turret 280. The belt conveyor 276 is provided at both ends thereof with guides (not shown).

The reference numeral 394 is a bracket plate fixed to the supporting frame 296 through an adapter plate 398, which bracket plate 394 transversely bears a cross girder 170 which adds to and supports a cross beam 396, to the tip end of the cross beam 396 being attached cam guides 176, 178.

In the second embodiment of this invention constructed as above there are applied just the same series of operation procedures as in the first embodiment thereof starting from the operation of guiding and holding the parison P by the tip end seat 44a of the flash blow-pipe 44 when the parison P extruded and hanging from the die head 54 has arrived at a predetermined phase position on the circular rotation track Y while a large number of the mold stations 46 rotate continuously on and along the same circular rotation track Y; the operation of enclosing the parison P with an open split mold unit 36; the operation of clamping the mold; the operation of blowing air into the parison P now in the molding portion of the split mold unit 36 to thereby effect molding; the operation of cooling the closed split mold unit 36 to harden the molded article; the operation of opening the split mold unit 36 when arrived at a predetermined phase position on the circular rotation track Y; the operation of blowing off the scrap parison Pb which has been separated from the parison Pa present in the molding portion and is now held by the tip end seat 44a of the flash blow-pipe 44, into the recovery hopper 52 to thereby recovery the scrap parison Pb; and up to the operation of releasing the molded article from the split mold unit 36.

Figure 11:
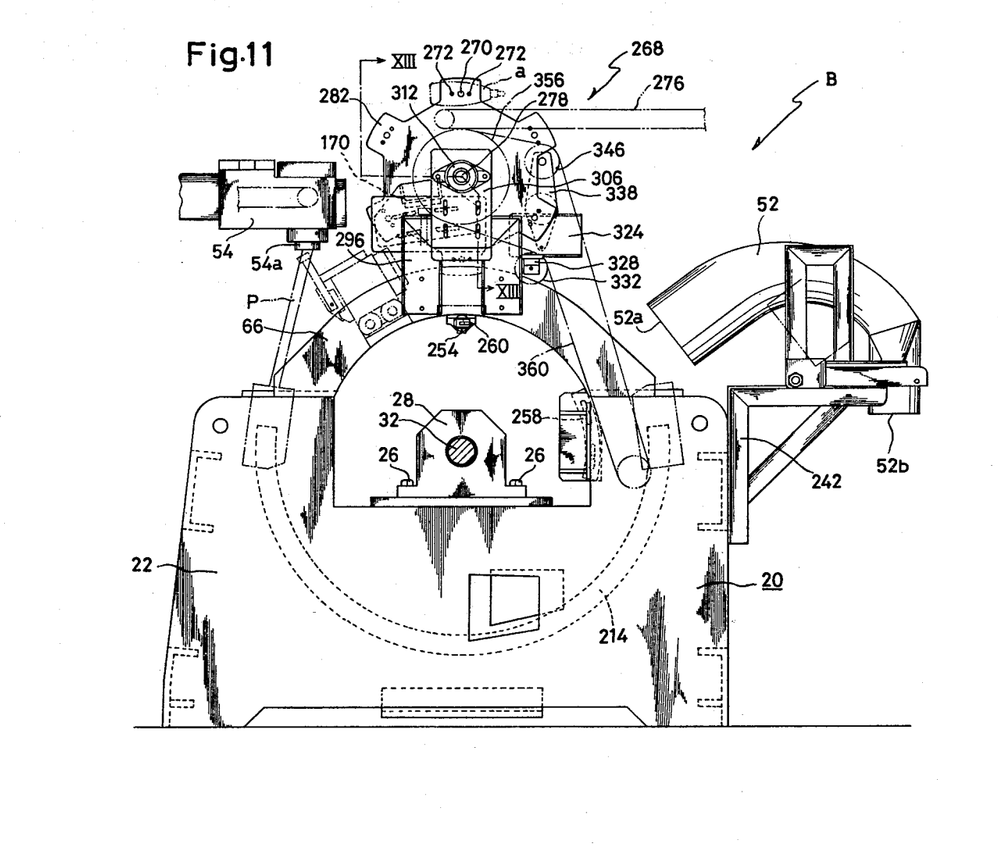
FIGS. 11 and 12 are a partially omitted, schematic right side view and a partially cutaway rear view respectively showing a second embodiment of the molding machine of this invention.
Figure 12:
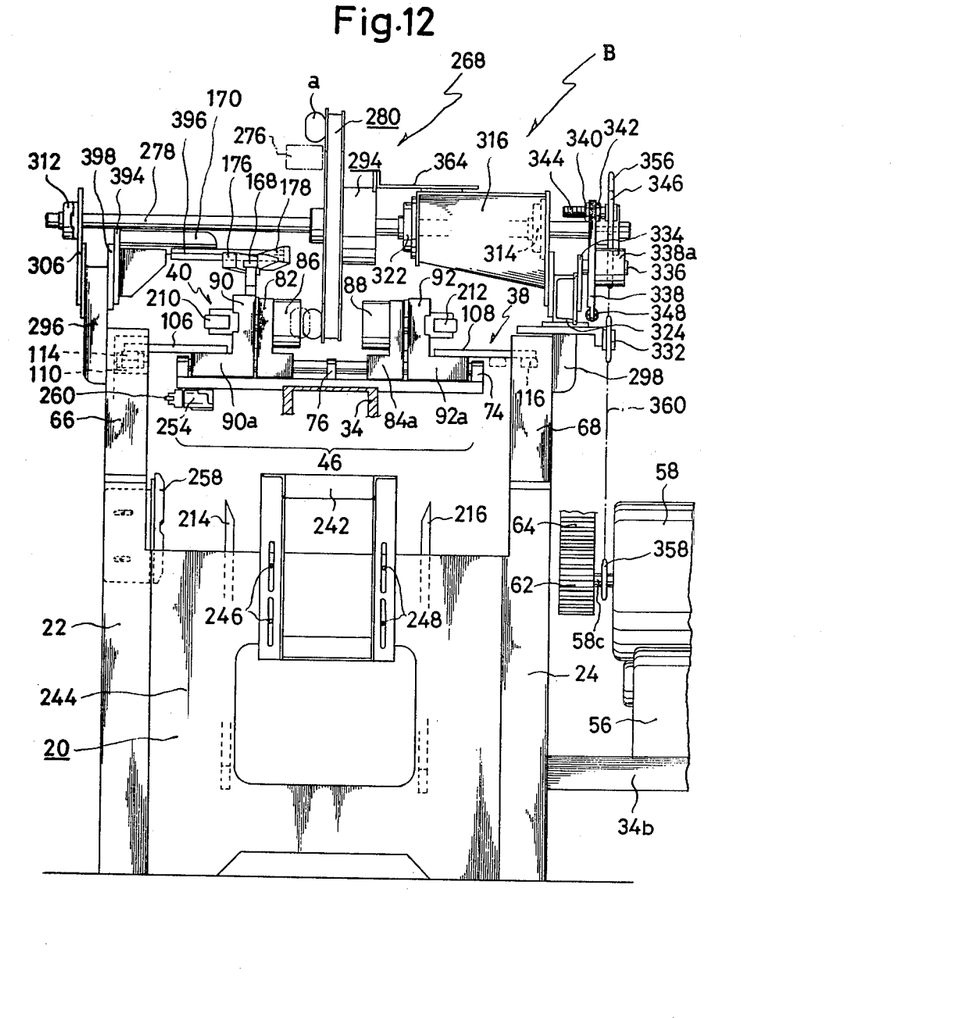

Referring now to the operational procedure of the ejector mechanism 268, at the instant the split mold unit 36 arrived in open state at the phase portion YO of the top origin on the circular rotation track Y and the molded article knocked out from the mold half 86, one catch/holder portion 282 of the eject feed turret 280 arrives at the bottom phase position and wedges itself in between both mold halves 86, 88, and the valve port 292 corresponding to the catch/holder portion 282 in the bottom position is released from its sliding contact with the slide valve plate 376 of the valve mechanism 294 and thus is not closed, so that the interior of the vacuum valve box 370 and the division chamber 288 corresponding to the said valve port 292 communicate with each other. As a result, the molded article being knocked out is instantly attracted and held by the suction holes 270, 272 in such a constant posture as shown in FIGS. 11 and 12. With this posture left intact, the eject feed turret 280 rotates at a constant speed and, when the catch/holder portion 282 which carries thereon the molded article 'a' attracted and held by the suction holes 270, 272 has arrived at the top phase position which faces the upper side of the starting end of the belt conveyor 276, the slide valve plate 374 of the valve mechanism 294 starts a closure in sliding contact with respect to the valve port 292 corresponding to the catch/holder portion 282, so that the communication between the interior of the vacuum valve box 370 and the division chamber 288 corresponding to the said valve port 292 is cut off. Consequently, the sticking and holding force of the molded article 'a' to the suction holes 270, 272 is relieved, so that the molded article 'a'a drops in a certain posture onto the starting end of the belt conveyor 276. With the same posture kept by side guides (not shown) provided on both sides, the molded article 'a'a rides on the belt conveyor 276 and is transferred to a heat sealer (not shown) for heat sealing the hole which has been formed by the piercing of blow needle (not shown).

Thus, the second embodiment of this invention is effective in the case where it is necessary to impart a certain directivity to molded articles being discharged.

Having now described the first and second embodiments of this invention, it will be appreciated by those skilled in the art that certain modifications may be made without departing from the invention in its broadest sense as defined in the appended claims except insofar as limited by the prior art.

What is claimed is:

1. A rotary blow molding machine comprising a rotor mounted on a horizontal driving shaft; mold stations mounted on the outer periphery of said rotor so as to be radially disposed and circumferentially equally spaced, said mold stations each carrying thereon a split mold unit capable of opening and closing in the direction of the width of the outer periphery surface of said rotor; flash blow-pipes rotatable with said mold stations, a tip end of each of said flash blow-pipes facing between said mold stations, said mold stations moving on a circular rotation track described by the center of each of said split mold units, said flash blow-pipes being adapted to guide and hold a parison extruded from a die head disposed adjacent to said track, said flash blow-pipes also being adapted to blow off a portion of the scrap parison, which is produced when closing and clamping said split mold units, to a position outside said circular rotation track; ejector means mounted in a wedged form between said split mold units within an area on said circular rotation track within which said split mold units are kept open; mold-release means on said split mold units for releasing a molded article from said split mold units and operable adjacent to said ejector means when said split mold units are open, said ejector means receiving a molded article released by said mold-release means from one mold half of said split mold unit in open state and discharging it to a position outside said circular rotation track.

2. The rotary blow molding machine as claimed in claim 1, in which said split mold units are held by a pair of opposed mold holder means which are mounted slidably on guide rods, said guide rods being carried on a supporting base which is mounted on the outer periphery of said rotor.

3. The rotary blow molding machine as claimed in claim 1, comprising a frame for rotatably supporting said rotor; first and second pairs of cam rails carried by said frame; guide rods on said mold stations; said split mold units comprising mold holder means and slider means connected therewith, said split, mold units being slidably mounted on said guide rods, mold opening/closing means and also mold clamping means projecting from each of said slider means having respective pairs of cam followers cooperable respectively with one of said pairs of cam rails for development of a camming action, whereby the mold opening and closing as well as the mold clamping motion are controlled.

4. The rotary blow molding machine as claimed in claim 3, in which said slider means are L-shaped and said mold opening/closing means includes overhung rods each of which is mounted on the horizontal portion of each L-shaped slider means so as to project outwardly thereof, said overhung rods being provided at the respective tip ends with one of said pairs of cam followers so as to allow an idle motion and which are adapted to engage a first of said pairs of cam rails, said cam rails being disposed symmetrically and circularly so as to expand in spacing in the said open region of said rotation track which passes through the center of each of said split mold units and contract in spacing in a closure area on said rotation track with the entirety of said rotation track put centrally therebetween and along both right and left sides of said rotation track.

5. The rotary blow molding machine as claimed in claim 3, in which said slider means are L-shaped, the cam followers of said mold clamping means being attached for idle motion to an outside vertical face of said L-shaped slider means, said cam followers being engageable with one pair of said cam rails which are disposed in parallel and in the form of an arc along both sides of only the closure area on said rotation track which passes through the center of each of said split mold units and with said closure area alone put between said cam rails.

6. The rotary blow molding machine as claimed in claim 1, in which said flash blow-pipe has a flat section and is mounted upwards at one end of a supporting base which is mounted on the outer periphery of said rotor.

7. The rotary blow molding machine as claimed in claim 1, in which the tip end of said flash blow-pipe is notched to form a seat for guiding and holding the parison extruded and hanging from the die head.

8. The rotary blow molding machine as claimed in claim 1, in which said mold-release means includes a knock-out pin the inner end of which is projectable from a concaved inside surface of one mold half of each of said split mold units, and the outer end thereof being connected to one end of a pivoted operating lever, to the other end of said operating lever being attached a cam follower which engages and follows a cam guide to project said knock-out pin from said concaved inside surface against the resilient force of said operating lever.

9. The rotary blow molding machine as claimed in claim 1, in which said ejector means includes a discharge chute, said discharge chute being provided at the lower end thereof with an intake port which faces the upper side of said rotation track and also provided at the upper end thereof with a discharge port which faces the upper side of the starting end of a belt conveyor, the intermediate portion of said discharge chute extending tangentially upwards with respect to said rotation track, and an air pipe for blowing off a released, molded article which has been advanced forwardly by said flash blow-pipe forcibly into said intake port, the tip end of said air pipe facing said intake port.

10. The rotary blow molding machine as claimed in claim 9, in which said discharge chute consists of a series connection between an arc-shaped duct portion comprising the front half and a paling tunnel portion comprising the latter half, and is provided intermediate said duct portion with a window capable of being opened and closed.

11. The rotary blow molding machine as claimed in claim 1, in which said discharge chute includes a pair of receiving guides for catching a molded article released from one mold half of the split mold unit when in an open state, and also includes a guide gutter projecting from the intake port, said receiving guides extending forwardly in parallel from both sides of the inside bottom portion of said guide gutter so that they extend in a wedged form under the split mold unit arriving in an open state.

12. The rotary blow molding machine as claimed in claim 1, in which said ejector means consists of an eject feed turret, said eject feed turret having suction holes for catching and holding by vacuum suction the molded article which has been knocked out by said mold-release means from one mold half of the split mold unit in open state, said suction holes being formed at equal distances in the outer peripheral direction of one side of said eject feed turret by the same number as the number of said mold stations mounted on the outer periphery of said rotor, said eject feed turret being mounted on a horizontal turret shaft which is rotatable in synchronism with a horizontal driving shaft of said rotor and being circulatable up and down from a belt conveyor means to between both mold halves of the mold station in open state so that said suction holes arriving at the top phase position face the side of the starting end of the belt conveyor means and said suction holes arriving at the bottom phase position face said one mold half.

13. The rotary blow molding machine as claimed in claim 12, in which said suction holes are formed in plural numbers in a catching seat of one side of each of catch/holder portions, said catch/holder portions projecting radially from the outer periphery of said eject feed turret.

14. The rotary blow molding machine as claimed in claim 12, in which said eject feed turret has its interior through the center of which extends said horizontal turret shaft, said interior being partitioned equiangularly in correspondence to said suction holes, said eject feed turret being also provided in one side thereof with valve ports in positions which are close to and surround said horizontal turret shaft, said valve ports being formed circumferentially at equal distances, said eject feed turret being further provided with valve means through which said horizontal turret shaft extends rotatably, said valve means being in close contact with and in an enveloping relation to said valve ports so that it can close the valve port arriving at a predetermined phase position.

15. The rotary blow molding machine as claimed in claim 14, in which said valve means includes a vacuum valve box communication with a vacuum source, said vacuum valve box containing a slide valve plate which is adapted to close the valve port arriving at a predetermined phase position of said eject feed turret, said slide valve plate being adjustable in mounting phase position so that during a rotation section during which said suction hole of said eject feed turret moves from one mold half about to complete the knock-out of molded article to said belt conveyor means, said valve plate does not slide and close said valve port of the division chamber corresponding to said suction hole.

16. The rotary blow molding machine as claimed in claim 14, in which, to an end of said horizontal turret shaft of said eject feed turret is fixed an input sprocket, and an output sprocket is coaxially fixed to the output shaft of a reduction gear to which is secured a pinion for gearing a driving torgue to the horizontal driving shaft, both said input and output sprockets being connected together by an endless transmission chain whereby each of said split mold units mounted on said rotor and the corresponding catch/holder portion can be present together at the phase position of the top origin on said rotation track which passes through the center of each said split mold unit.

* * * * *